(12) United States Patent
Fastow et al.

(10) Patent No.: US 9,230,548 B2
(45) Date of Patent: Jan. 5, 2016

(54) HYBRID HASHING SCHEME FOR ACTIVE HMMS

(71) Applicant: Spansion LLC, Sunnyvale, CA (US)

(72) Inventors: Richard M. Fastow, Cupertino, CA (US); Ojas A. Bapat, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 488 days.

(21) Appl. No.: 13/725,173

(22) Filed: Dec. 21, 2012

(65) Prior Publication Data

US 2014/0180690 A1    Jun. 26, 2014

(51) Int. Cl.
*G10L 15/00*    (2013.01)
*G10L 15/14*    (2006.01)
*G10L 15/28*    (2013.01)

(52) U.S. Cl.
CPC .................................. *G10L 15/285* (2013.01)

(58) Field of Classification Search
CPC ..... G10L 15/142; G10L 15/144; G10L 15/14; G10L 15/146; G10L 15/16; G10L 15/183; G10L 2015/085; G06K 9/6297; G06K 9/00879; G06K 9/6256; G06N 3/0454; G06N 3/084; G06N 99/005; H04L 25/03171; H04L 25/03178; H04L 9/0643; G06F 12/1018; G06F 17/30949; G06F 3/0641; G06F 17/30097; G06F 3/0608; G06F 17/3033
USPC .............. 704/256, 256.1–256.8; 711/216
See application file for complete search history.

(56) References Cited

U.S. PATENT DOCUMENTS

| | | | | |
|---|---|---|---|---|
| 4,852,180 A * | 7/1989 | Levinson | .................... | 704/256.4 |
| 5,032,987 A * | 7/1991 | Broder et al. | ................. | 711/221 |
| 5,900,001 A * | 5/1999 | Wolczko et al. | ...................... | 1/1 |
| 5,911,144 A * | 6/1999 | Schwartz et al. | ..................... | 1/1 |
| 6,052,698 A * | 4/2000 | Bennett et al. | ........................ | 1/1 |
| 6,067,547 A * | 5/2000 | Douceur | ............................... | 1/1 |
| 6,226,634 B1* | 5/2001 | Ogihara et al. | ...................... | 1/1 |
| 6,567,817 B1* | 5/2003 | VanLeer | ............................... | 1/1 |
| 7,031,985 B1* | 4/2006 | Pecheny | .............................. | 1/1 |
| 7,035,802 B1* | 4/2006 | Rigazio et al. | ............... | 704/256 |
| 7,039,764 B1* | 5/2006 | Shetty et al. | ................. | 711/133 |

(Continued)

FOREIGN PATENT DOCUMENTS

JP    7-168848 A    7/1995

OTHER PUBLICATIONS

David Guthrie et al., "Efficient Minimal Perfect Hash Language Models," Proceedings of the Seventh International Conference on Language Resources and Evaluation, pp. 2889-2896, May 19-21, 2010.*

(Continued)

*Primary Examiner* — Edgar Guerra-Erazo

(57) ABSTRACT

Embodiments of the present invention include a data storage device and a method for storing data in a hash table. The data storage device can include a first memory device, a second memory device, and a processing device. The first memory device is configured to store one or more data elements. The second memory device is configured to store one or more status bits at one or more respective table indices. In addition, each of the table indices is mapped to a corresponding table index in the first memory device. The processing device is configured to calculate one or more hash values based on the one or more data elements.

19 Claims, 13 Drawing Sheets

(56) References Cited

U.S. PATENT DOCUMENTS

| | | | |
|---|---|---|---|
| 7,107,258 B2* | 9/2006 | Cheng et al. | 707/698 |
| 7,877,256 B2* | 1/2011 | Li et al. | 704/256 |
| 8,209,178 B1* | 6/2012 | Talbot et al. | 704/255 |
| 8,332,433 B2* | 12/2012 | Bentkofsky et al. | 707/791 |
| 9,047,868 B1* | 6/2015 | O'Neill et al. | 1/1 |
| 2002/0046017 A1* | 4/2002 | Kempe | 704/1 |
| 2003/0182291 A1* | 9/2003 | Kurupati et al. | 707/100 |
| 2005/0044134 A1 | 2/2005 | Krueger et al. | |
| 2006/0122989 A1 | 6/2006 | Kurupati et al. | |
| 2007/0098150 A1* | 5/2007 | Lauter et al. | 380/28 |
| 2007/0115986 A1* | 5/2007 | Shankara | 370/392 |
| 2008/0034115 A1* | 2/2008 | Chu et al. | 709/239 |
| 2009/0240913 A1* | 9/2009 | Obana et al. | 711/216 |
| 2010/0211378 A1* | 8/2010 | Bulyko | 704/9 |
| 2010/0235392 A1* | 9/2010 | McCreight et al. | 707/780 |
| 2010/0272256 A1* | 10/2010 | Baras et al. | 380/46 |
| 2011/0093664 A1* | 4/2011 | Leppard | 711/154 |
| 2012/0095974 A1* | 4/2012 | Bentkofsky et al. | 707/703 |
| 2012/0102298 A1 | 4/2012 | Sengupta et al. | |
| 2012/0173510 A1 | 7/2012 | Rizvik et al. | |

OTHER PUBLICATIONS

Phillips, Steven, and Anne Rogers. "Parallel speech recognition." International Journal of Parallel Programming 27.4 (1999): 257-288.*

International Search Report and Written Opinion of the International Searching Authority for International Application No. PCT/US2013/075313, mailed Mar. 31, 2014.

English language abstract of Japanese Patent Document 7-168848-A.

Pending Application, U.S. Appl. No. 13/489,799, inventors Fastow et al., filed Jun. 6, 2012 (Not Published).

* cited by examiner

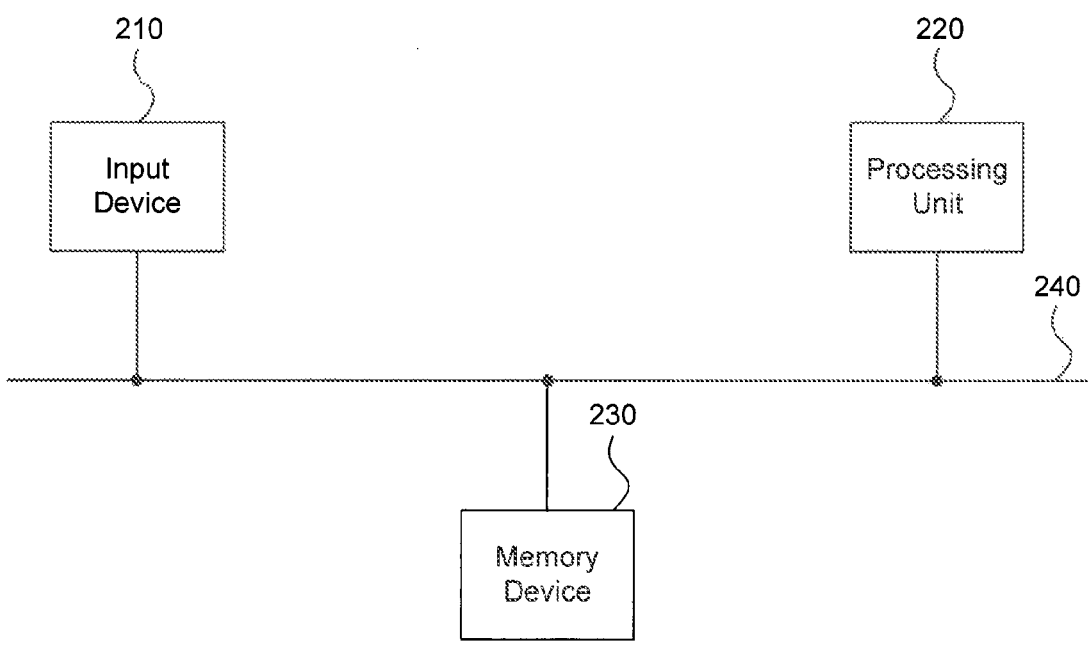
FIG. 2
(Conventional)

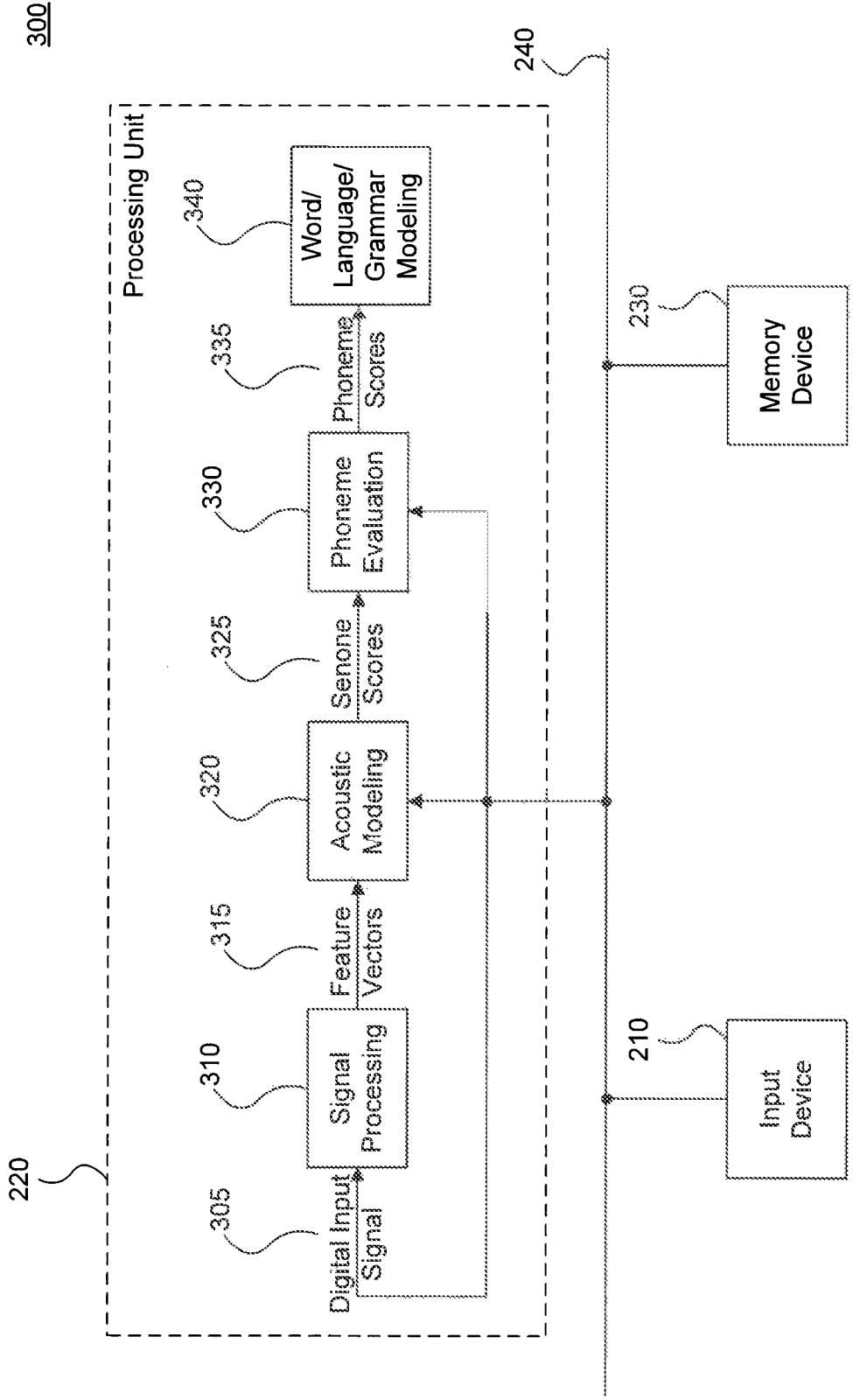
FIG. 3
(Conventional)

HYBRID HASHING SCHEME FOR ACTIVE HMMS

CROSS REFERENCE TO RELATED APPLICATION

This application is related to U.S. patent application Ser. No. 13/489,799, filed Jun. 6, 2012, titled "Acoustic Processing Unit," which is incorporated by reference in its entirety.

BACKGROUND

1. Field

Embodiments of the present invention generally relate to data pattern recognition. More particular, embodiments of the present invention relate to a phoneme score accelerator for data pattern recognition.

2. Background

Real-time data pattern recognition is increasingly used to analyze data streams in electronic systems. For example, on a vocabulary with over tens of thousands of words, speech recognition systems have achieved improved accuracy, making it an attractive feature for electronic systems. Speech recognition systems are increasingly common in consumer markets targeted to data pattern recognition applications such as, for example, the mobile device, server, automobile, and PC markets.

Despite the improved accuracy in speech recognition systems, significant computing resources are dedicated to the speech recognition process, in turn placing a significant load on computing systems such as, for example, multiuser/multiprogramming environments. Multiprogramming computing systems concurrently process data from various applications and, as a result, the load placed on these computing systems by the speech recognition process affects the speed at which the computing systems can process incoming voice signals as well as data from other applications. Further, for handheld devices that typically include limited memory resources (as compared to desktop computing systems), speech recognition applications not only place significant load on the handheld device's computing resources but also consume a significant portion of the handheld device's memory resources. The above speech recognition system issues of processing capability, speed, and memory resources are further exacerbated by the need to process incoming voice signals in real-time or substantially close to real-time.

SUMMARY

Therefore, there is a need to improve the load that speech recognition systems place on the processing capability, speed, and memory resources of computing systems.

An embodiment of the present invention includes a data storage device. The data storage device can include a first memory device, a second memory device, and a processing device. The first memory device is configured to store one or more data elements. The second memory device is configured to store one or more status bits at one or more respective table indices. In addition, each of the table indices is mapped to a corresponding table index in the first memory device. The processing device is configured to calculate one or more hash values based on the one or more data elements.

Another embodiment of the present invention includes a method for storing data. The method can include the following: hashing a first data to generate a table index and reading a valid bit at the table index of a first memory device. The valid bit indicates whether a table entry at a corresponding table index of a second memory device is valid.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

FIG. 2 is an illustration of a conventional speech recognition system.

FIG. 3 is an illustration of a conventional speech recognition system with speech recognition processes performed by an individual processing unit.

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the scope of the invention. Rather, the scope of the invention is defined by the appended claims.

It would be apparent to a person skilled in the relevant art that the present invention, as described below, can be implemented in many different embodiments of software, hardware, firmware, and/or the entities illustrated in the figures. Thus, the operational behavior of embodiments of the present invention will be described with the understanding that modifications and variations of the embodiments are possible, given the level of detail presented herein.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

1. SPEECH RECOGNITION PROCESS

Figure 1:
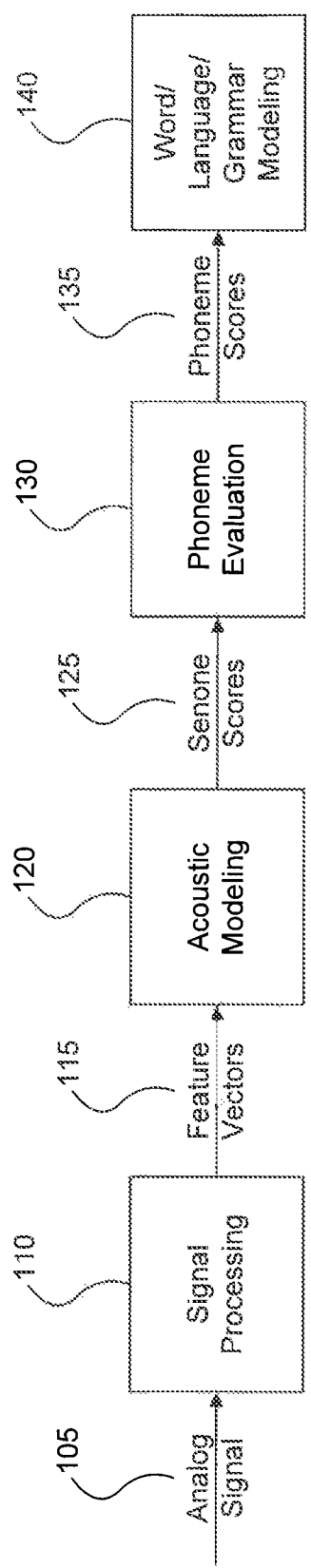
FIG. 1 is an illustration of an exemplary flowchart of a speech recognition process according to an embodiment of the present invention.

FIG. 1 is an illustration of an exemplary flowchart of a speech recognition process 100 according to an embodiment of the present invention. Speech recognition process 100 includes a signal processing stage 110, an acoustic modeling stage 120, a phoneme evaluation stage 130, and a word/language/grammar modeling stage 140.

In signal processing stage 110, an analog signal representation of an incoming voice signal 105 can be filtered to eliminate high frequency components of the signal that lie outside the range of frequencies that the human ear can hear. The filtered signal is then digitized using sampling and quantization techniques well known to a person skilled in the relevant art. One or more parametric digital representations (also referred to herein as "feature vectors 115") can be extracted from the digitized waveform using techniques such as, for example, linear predictive coding and fast Fourier transforms. This extraction can occur at regular time intervals, or frames, of approximately 10 ms, for example.

In acoustic modeling stage 120, feature vectors 115 from signal processing stage 110 are compared to one or more multivariate Gaussian probability distributions (also referred to herein as "Gaussian probability distributions") stored in memory. The one or more Gaussian probability distributions stored in memory can be part of an acoustic library, in which the mixtures of Gaussian probability distributions represent senones. A senone refers to a sub-phonetic unit for a language of interest, as would be understood by a person skilled in the relevant art. An individual senone can be made up of, for example, 8 components, in which each of the components can represent a 39-dimension Gaussian probability distribution.

Acoustic modeling stage 120 can process over 1000 senones, for example. As a result, the comparison of feature vectors 115 to the one or more Gaussian probability distributions can be a computationally and memory intensive task, as thousands of Gaussian probability distributions, for example, can be compared to feature vectors 115 every time interval or frame (e.g., 10 ms). A set of scores for each of the senones represented in the acoustic library (also referred to herein as "senone scores") results from the comparison of each of feature vectors 115 to each of the one or more Gaussian probability distributions. Acoustic modeling stage 120 provides senone scores 125 to phoneme evaluation stage 130.

In phoneme evaluation stage 130, Hidden Markov Models (HMMs) can be used to characterize a phoneme as a set of states and an a priori set of transition probabilities between each of the states, where a state is associated with a senone. For a given observed sequence of senones, there is a most-likely sequence of states in a corresponding HMM. This corresponding HMM can be associated with an observed phoneme. A Viterbi algorithm can be used to find the likelihood of each HMM corresponding to a phoneme.

The Viterbi algorithm performs a computation that starts with a first frame and then proceeds to subsequent frames one-at-a-time in a time-synchronous manner. A probability score is computed for each senone in the HMMs being considered. Therefore, a cumulative probability score can be successively computed for each of the possible senone sequences as the Viterbi algorithm analyzes sequential frames. Similar to the calculation of senone scores by acoustic modeling stage 120, the calculation of the cumulative probability score can be a computationally and memory intensive task. Phoneme evaluation stage 130 provides the phoneme likelihoods or probabilities 135 (also referred to herein as a "phoneme score") to word/language/grammar modeling stage 140.

In word/language/grammar modeling stage 140, searching techniques are used to determine a most-likely string of phonemes and subsequent words, over time. Searching techniques such as, for example, tree-based algorithms can be used to determine the most-likely string of phonemes. As a person skilled in the relevant art will understand, the Phoneme Evaluation stage can also be used to compute the scores of HMMs of variable length which, for instance, represent a sequence of phonemes, whole words, or Arcs of a Finite State Transducer.

2. CONVENTIONAL SPEECH RECOGNITION SYSTEM

FIG. 2 is an illustration of a conventional speech recognition system 200. Speech recognition system 200 includes an input device 210, a processing unit 220, a memory device 230, and a data bus 240, all of which are separate physical components. Memory device 230 can be, for example, a Dynamic Random Access Memory (DRAM) device that is external to processing unit 220 and in communication with processing unit 220 via data bus 240. Input device 210 is also in communication with processing unit 220 via data bus 240. Data bus 240 has a typical bus width of, for example, 8 to 32 bits.

Input device 210 is configured to receive an incoming voice signal (e.g., incoming voice signal 105 of FIG. 1) and convert acoustical vibrations associated with the incoming voice signal to an analog signal. The analog signal is digitized using an analog to digital converter (not shown in FIG. 2), and the resulting digital signal is transferred to processing unit 220 over data bus 240. Input device 210 can be, for example, a microphone.

Processing unit 220 is configured to process the digital input signal in accordance with the signal processing stage 110, acoustic modeling stage 120, phoneme evaluation stage 130, and word/language/grammar modeler stage 140 described above with respect to FIG. 1. FIG. 3 is an illustration of speech recognition system 200 with speech recognition modules performed by processing unit 220. Processing unit 220 includes signal processing module 310, acoustic modeling module 320, phoneme evaluation module 330, and word/language/grammar modeling module 340, which operate in a similar manner as signal processing stage 110, acoustic modeling stage 120, phoneme evaluation stage 130, and word/language/grammar modeler stage 140 of FIG. 1, respectively.

In reference to FIG. 3, signal processing module 310 can convert a digital input signal representation of incoming voice signal 305 (e.g., from input device 210) into one or more feature vectors 315. Acoustic modeling module 320 compares one or more feature vectors 315 to one or more Gaussian probability distributions stored in an acoustic library in memory device 230. That is, for each of the comparisons of one or more feature vectors 315 to the one or more Gaussian probability distributions, processing unit 220 accesses memory device 230 via data bus 240. For an acoustic library with thousands of senones (in which each of the senones is composed of a plurality of Gaussian probability distributions), not only are the comparisons performed by acoustic modeling module 320 computationally-intensive but the thousands of accesses to memory device 230 via data bus 240 by acoustic modeling module 320 are also memory-intensive and time consuming. In addition, phoneme evaluation module 330 also accesses memory device 230 for the calculation of cumulative probability scores. The thousands of accesses to memory device 230 is further exacerbated by the bus width of data bus 240 (e.g., typically 8 to 32 bits), in which multiple accesses to memory device 230 may be required by acoustic modeling module 320 phoneme evaluation module 330. Further, interconnect parasitics associated with data bus 240 may corrupt data transfer between memory device 230 and acoustic modeling module 320 and between memory device 230 and phoneme evaluation module 330.

Phoneme evaluation module 330 receives senone scores 325 from acoustic modeling module 320. As discussed above with respect to speech recognition process 100 of FIG. 1, HMMs can be used to characterize a phoneme as a set of states and an a priori set of transition probabilities between each of the states, where a state is composed of a sequence of senones. The sets of states and a priori sets of transition probabilities used by phoneme evaluation module 330 can be stored in memory device 230. Phoneme evaluation module 330 provides phoneme scores 335 to word/language/grammar modeling module 340.

Word/language/grammar modeling module 340 uses searching techniques such as, for example, tree-based algorithms to determine a most-likely string of phonemes (e.g., most-likely phoneme 335), and subsequent words, over time.

An issue with conventional speech recognition system 300 of FIG. 3, among others, is the significant load on processing unit 220 due to the acoustic modeling and phoneme evaluation processes. For example, for each comparison of one or more feature vectors 315 to the one or more Gaussian probability distributions stored in memory device 230, memory device 230 is accessed by processing unit 220. Similarly, in the phoneme evaluation process, processing unit 220 accesses memory device 230 to retrieve state and a priori transition probability information for the calculation of cumulative probability scores. As a result, significant computing and memory resources are dedicated to the acoustic modeling and phoneme evaluation processes, in turn placing a significant load on processing unit 220 and memory unit 230.

The load placed on processing unit 220 by the acoustic modeling and phoneme evaluation processes affect the speed at which processing unit 220 can process digital signals from input device 210 as well as data from other applications (e.g., where processing unit 220 can operate in a multiuser/multi-programming environment that concurrently processes data from a plurality of applications). Further, for computing systems with limited memory resources (e.g., handheld devices), the acoustic modeling and phoneme evaluation processes not only place a significant load on processing unit 220, but also consumes a significant portion of memory device 230 and bandwidth of data bus 240. These issues, among others, with processing capabilities, speed, and memory resources are further exacerbated by the need to process incoming voice signals in real-time or substantially close to real-time in many applications.

3. SPEECH RECOGNITION SYSTEM WITH PHONEME SCORE ACCELERATOR

Embodiments of the present invention address the issues discussed above with respect to conventional speech recognition systems 200 and 300 of FIGS. 2 and 3, respectively. In an embodiment, the acoustic modeling process is performed by a dedicated processing unit (also referred to herein as an "Acoustic Co-Processor" or "ACP"). The ACP operates in conjunction with processing unit 220 of FIG. 3 (also referred to herein as a "Central Processing Unit" or "CPU"). For example, the ACP receives one or more feature vectors (e.g., feature vectors 315 of FIG. 3) from the CPU, calculates a senone score (e.g., senone score 325 of FIG. 3) based on one one or more Gaussian probability distributions, calculates a phoneme score based on the senone score, and outputs the phoneme score to the CPU.

In an embodiment, the one or more Gaussian probability distributions and HMM information (e.g., HMM dictionary, HMM state information, and a priori transition probability information) can be stored in a memory device location in the ACP. In another embodiment, the one or more Gaussian probability distributions and HMM information can be stored in a dedicated memory device external to the ACP, in which the ACP receives the one or more Gaussian probability distributions and HMM information from an external memory device. The dedicated memory device is separate from system memory associated with the CPU (e.g., memory device 230 of FIG. 3), according to an embodiment of the present invention. In yet another alternative, either the one or more Gaussian probability distributions or HMM information can be stored in the dedicated memory device external to the ACP, in which the ACP receives the one or more Gaussian probability distributions or HMM information from the external memory device. Based on the architecture of the ACP, accelerated calculations of senone scores and phoneme scores are achieved.

The present disclosure is focused on the accelerated calculation of phoneme scores based on one or more senone scores. Details on the accelerated calculation of senone scores can be found, for example, in U.S. patent application Ser. No. 13/489,799, filed Jun. 6, 2012, titled "Acoustic Processing Unit," which is incorporated herein by reference in its entirety.

Although portions of the present disclosure is described in the context of a speech recognition system, a person skilled in the relevant art will recognize that the embodiments described herein are applicable to any data pattern recognition applications based on the description herein. These other data pattern recognition applications include, but are not limited to, image processing, audio processing, and handwriting recognition. These other data pattern recognition applications are within the spirit and scope of the embodiments disclosed herein.

Figure 4:
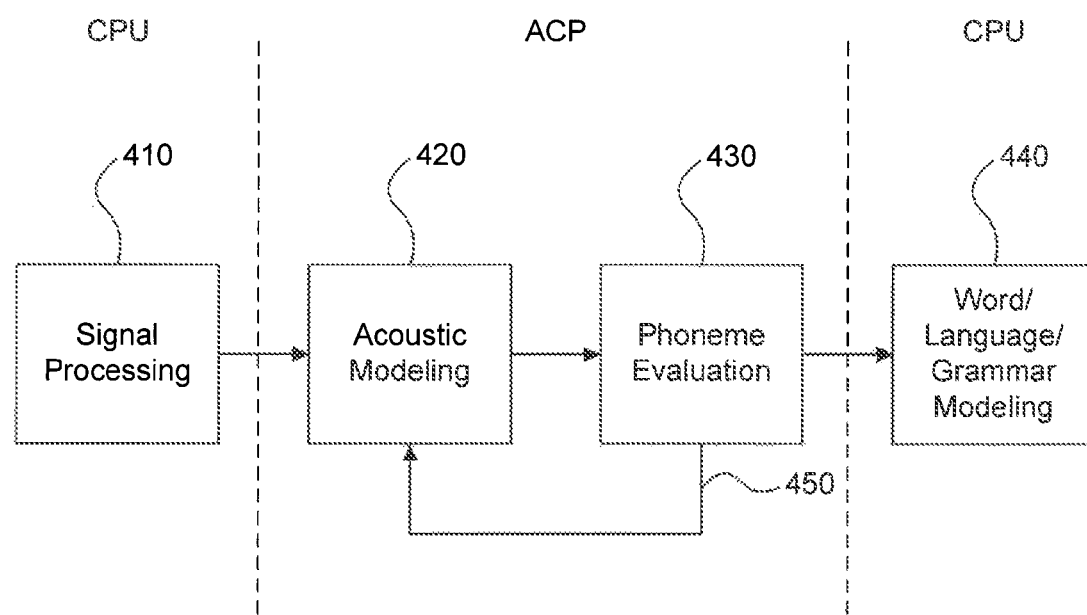
FIG. 4 is an illustration of an embodiment of speech recognition processes performed by an Acoustic Co-Processor (ACP) and a Central Processing Unit (CPU).

FIG. 4 is an illustration of an embodiment of a speech recognition process 400 performed by the ACP and CPU. In an embodiment, the CPU performs a signal processing process 410 and a word modeling process 440. The ACP performs an acoustic modeling process 420 and a phoneme evaluation process 430. Signal processing process 410, acoustic modeling process 420, phoneme evaluation process 430, and word/language/grammar modeling process 440 operate in a similar manner as signal processing stage 110, acoustic modeling stage 120, phoneme evaluation stage 130, and word/language/grammar modeler stage 140 of FIG. 1, respectively, except as otherwise described herein.

In reference to the embodiment of FIG. 4, feedback 450 is an optional feature of speech recognition process 400, in which phoneme evaluation process 430 can provide an active senone list to acoustic modeling process 420, according to an embodiment of the present invention. Acoustic modeling process 420 can compare one or more feature vectors to one or more senones indicated in the active senone list.

In another embodiment, acoustic modeling process 420 can compare the one or more feature vectors to all of the senones associated with an acoustic library. In this case, feedback 450 is not required, as phoneme evaluation process 430 receives an entire set of senone scores (e.g., "score all" function) from acoustic modeling process 420 for further processing. Additional information on the "score all" function can be found, for example, in U.S. patent application Ser. No. 13/489,799, filed Jun. 6, 2012.

4. ACOUSTIC CO-PROCESSOR ARCHITECTURE

Figure 5:
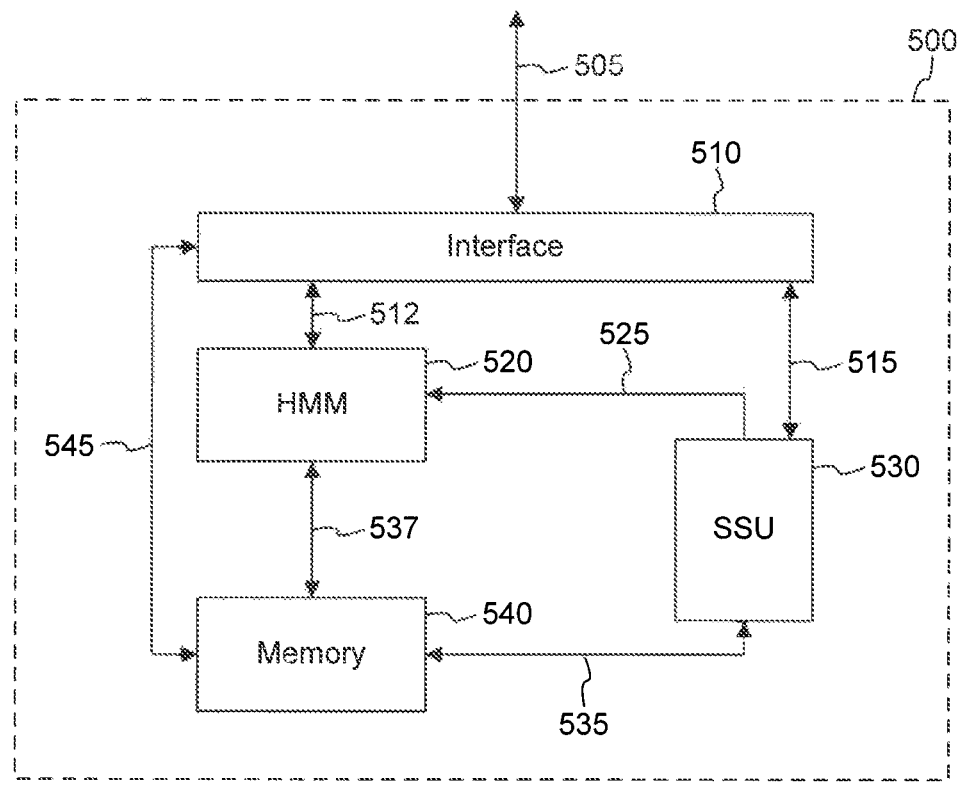
FIG. 5 is an illustration of an embodiment of an Acoustic Co-Processor (ACP).

FIG. 5 is an illustration of an embodiment of an ACP 500. In an embodiment, ACP 500 is an integrated chip that includes an interface module 510, a Hidden Markov Model (HMM) module 520, a Senone Scoring Unit (SSU) 530, and a memory module 540. In another embodiment, interface module 510, HMM module 520, SSU 530, and memory module 540 can be each integrated on separate chips or integrated on a common chip in any combination. For example and without limitation, interface module 510 and HMM module 520 can be integrated on the same chip, while SSU 530 and memory module 540 are integrated on their own respective chips. Alternatively, interface module 510, HMM module 520, and SSU 530 can be integrated on the same chip, while memory module 540 is integrated on its own chip.

ACP 500 is integrated on a separate chip as a CPU (not shown in FIG. 5) and is in communication with the CPU via input/output (I/O) bus 505, in which ACP 500 is configured to perform an acoustic modeling process (e.g., acoustic modeling process 420 of FIG. 4) and a phoneme evaluation process (e.g., phoneme evaluation process 430 of FIG. 4), according to an embodiment of the present invention. In an embodiment, I/O bus 505 can be defined by an API, in which I/O bus 505 can be used to facilitate the data transfer of feature vector information, phoneme score information, and other I/O control signals for ACP 500. ACP 500 can be configured to receive one or more feature vectors (calculated by the CPU) via I/O bus 505 from the CPU and to transmit a phoneme score via I/O bus 505 to the CPU for further processing (e.g., word modeling process 440 of FIG. 4), according to an embodiment of the present invention. In an embodiment, I/O bus 505 can be implemented as, for example, an SPI bus, a PCI bus, an AXI bus, an AHB, an APB, a memory bus, or any other type of bus to provide a communication path between ACP 500 and the CPU (see, e.g., FIGS. 5-7 and associated description in U.S. patent application Ser. No. 13/489,799, filed Jun. 6, 2012).

In reference to FIG. 5, interface module 510 is configured to control data transfer between ACP 500 and an external CPU. In an embodiment, interface module 510 can control the receipt of one or more feature vectors and one or more HMM scoring requests from the external CPU and the transmission of one or more phoneme scores (e.g., HMM state scores) from ACP 500 to the CPU. In an embodiment, interface module 510 is configured to transfer the one or more feature vectors from the CPU to SSU module 530 via bus 515 for further processing, as well as transfer the one or more HMM scoring requests from the CPU to HMM module 520 for further processing. While SSU module 530 calculates one or more senone scores for a frame of data and HMM module 520 traverses through an HMM (described in detail below), the CPU searches for additional HMMs to evaluate and sends additional HMM scoring requests to interface module 510, according to an embodiment of the present invention. As described below, the HMM scoring requests are received by HMM module 520 in the form of a patch list.

Upon calculation of a senone score, the senone score is transferred from SSU module 530 to memory module 540, according to an embodiment of the present invention. In another embodiment, the senone score is stored in a memory device in SSU module 530 (not shown in FIG. 5). Detailed information on the calculation of a senone score by SSU module 530 can be found, for example, in U.S. patent application Ser. No. 13/489,799, filed Jun. 6, 2012 (see, e.g., SSU 1430 of FIG. 14 and associated description). In an embodiment, SSU module 530 calculates one or more senone scores for a frame of data (e.g., 10 ms time interval or frame), while the CPU calculates a patch list (described in further detail below) for the same frame of data and transfers the patch list to HMM module 520 via interface module 510.

Figure 6:
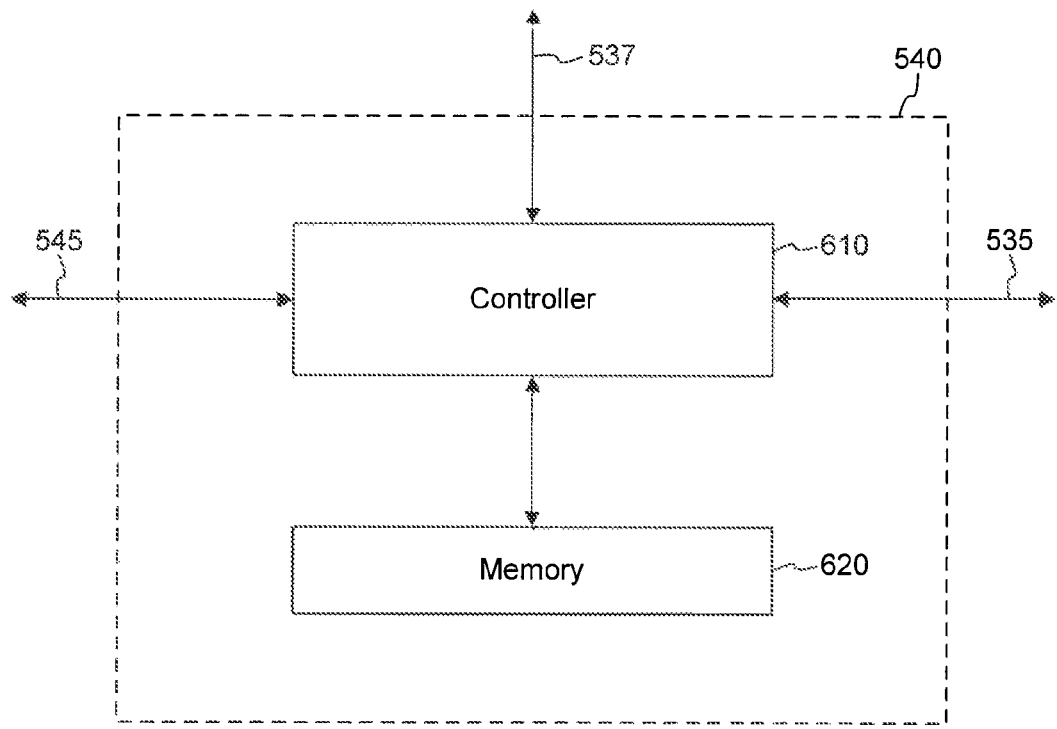
FIG. 6 is an illustration of an embodiment of a memory module in an Acoustic Co-Processor (ACP).

FIG. 6 is an illustration of an embodiment of memory module 540. Memory module 540 includes a memory controller 610 and a memory device 620. In an embodiment, memory controller 610 is configured to control data transfer between interface module 510 and memory device 620 via bus 545, between HMM module 520 and memory device 620 via bus 537, and between SSU module 530 and memory device 620 via bus 535. Memory device 620 can be a volatile memory device such as, for example and without limitation, a Dynamic Random Access Memory (DRAM) device, according to an embodiment of the present invention. Memory device 620 can be used to store an acoustic library (e.g., one or more Gaussian probability distributions), in which SSU module 530 accesses memory device 620 via bus 535 during the calculation of a senone score, according to an embodiment of the present invention. In an embodiment, memory device 620 can also be used to store senone score and HMM information (e.g., HMM dictionary, HMM state information, and a priori transition probability information), in which HMM module 520 accesses memory device 620 via bus 537. Memory device 620 can also be used to store control information received by ACP 500 from the CPU, in which the control information can be transferred to memory device 620 via bus 545, according to an embodiment of the present invention.

Figure 7:
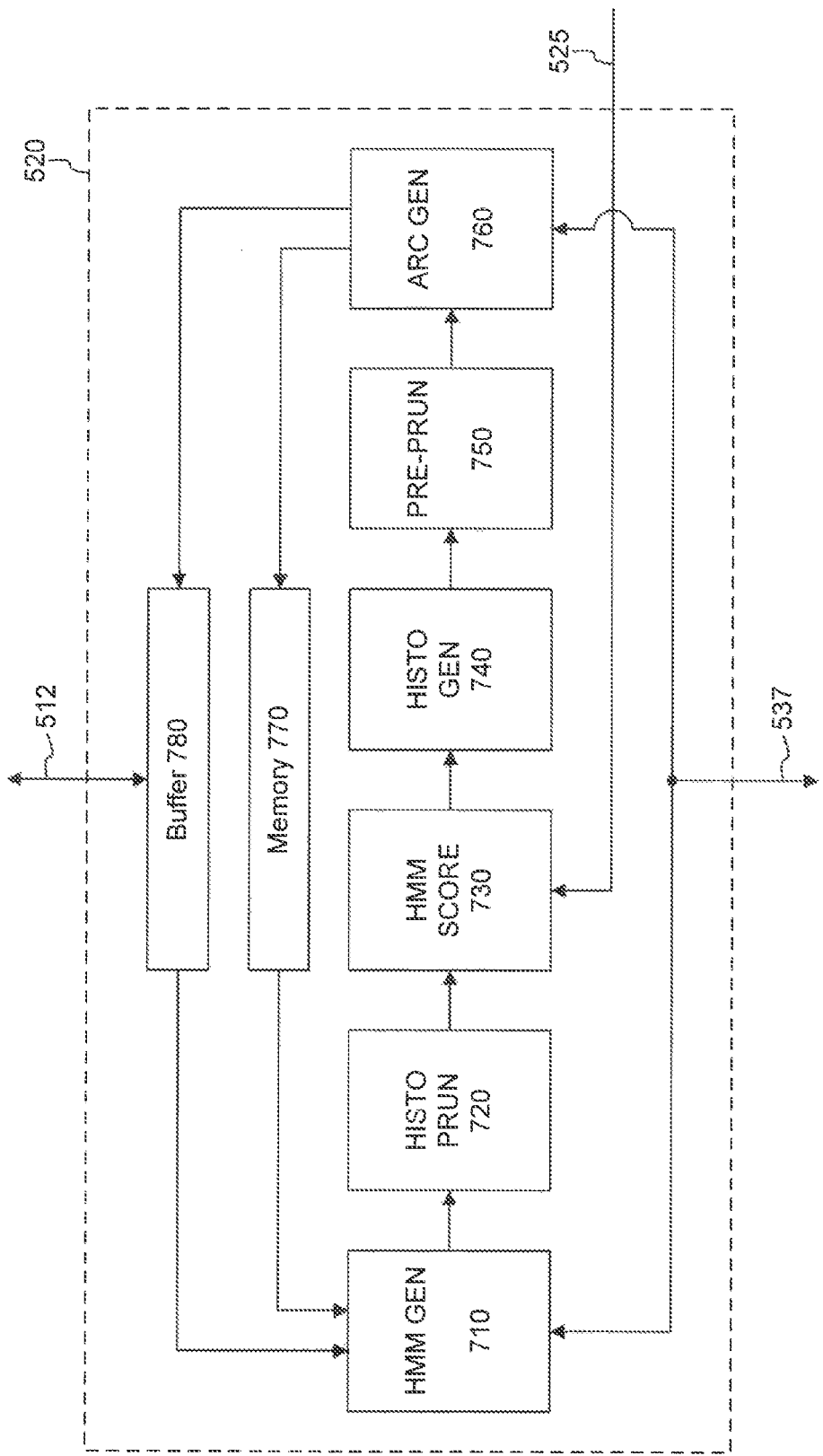
FIG. 7 is an illustration of an embodiment of a Hidden Markov Model (HMM) module in an Acoustic Co-Processor (ACP).

FIG. 7 is an illustration of an embodiment of HMM module 520 configured to traverse a Hidden Markov Model. HMM module 520 includes an HMM generator 710, a histogram pruning module 720, an HMM scoring module 730, a histogram generator 740, a pre-pruning module 750, an arc generator 760, a memory device 770, and a buffer 780. Based on the description, a person of ordinary skill in the relevant art will recognize that the components of HMM module 520 can traverse the HMM in a pipelined manner.

HMM generator 710 is configured to receive arc data from a patch list stored in buffer 780. In an embodiment, the arc data includes HMM IDs and initial HMM state scores that ACP 500 receives from the CPU via I/O bus 505 in FIG. 5. Prior to processing the arc data, HMM generator 710 verifies whether the arc data exists in memory device 620 of FIG. 6, according to an embodiment of the present invention. The arc data stored in memory module 620 (e.g., HMM IDs and HMM state scores) is also referred to herein as being in an "active list" of ACP 500. Memory device 770 stores one or more status bits corresponding to the state of the data in memory device 620, and can be a memory device that has a faster access time than memory device 620 of FIG. 6 such as, for example and without limitation, a Static Random Access Memory (SRAM) device.

If the arc data from the patch list exists in the active list, then the arc data from the patch list is merged with its corresponding arc data in the active list. In an embodiment, a left context of the existing arc data in the active list is replaced with the arc data from the patch list when the HMM state score associated with the arc data from the patch list is higher than the HMM state score associated with the existing arc data in the active list (e.g., the arc data from the patch list has a higher probability of matching the current frame of data). Each of the HMM states includes a state index (K) and a left context (K−1), where (K−1) refers to a state index prior to or to the left of state index (K). If the arc data from the patch list does not exist in the active list, then the arc data from the patch list is inserted into the active list, in which the left context of the new arc entry into the active list (e.g., (K−1)) is provided by the arc data from the patch list. Further, the HMM ID associated with the new arc entry (which is now in the active list) can be read from memory device 620 (e.g., from a HMM dictionary stored in memory device 620), according to an embodiment of the present invention.

The process of determining whether the arc data from the patch list exists in the active list and the process of merging and inserting the arc data from the patch list into the active list are described in further detail below in Section 5. Also, the details on the application of the left context for the arc data is described in further detail below with respect to HMM scoring module 730.

In reference to FIG. 7, in an embodiment, HMM generator 710 re-formats the arc data from the patch list as individual HMM states and outputs the individual HMM states to histogram pruning module 720. In addition to the individual HMM states, histogram pruning module 720 receives a pruning threshold (not shown in FIG. 7). Histogram pruning module 720 is configured to apply a beam pruning algorithm to the individual HMM states to help mitigate the amount of active data in ACP 500, according to an embodiment of the present invention. If the score of an individual HMM state is below the pruning threshold, then the individual HMM state is flagged as being "inactive" (e.g., active/inactive flag bit for HMM state is set to "low" or "inactive"). Otherwise, if the score of the individual HMM state is above the pruning threshold, then the individual HMM state is flagged as being "active." In an embodiment, the pruning threshold is calculated based on a histogram distribution of data from the previous time interval or frame (e.g., 10 ms) and a predetermined beam width.

In reference to FIG. 7, HMM scoring module 730 receives the HMM states with scores above the pruning threshold set by histogram pruning module 720 and one or more senone scores from memory device 620 of FIG. 6. As discussed above, the one or more senone scores are calculated by SSU module 530 of FIG. 5 and can be stored in memory device 620 of FIG. 6. A bus between memory device 620 and HMM scoring module 730 is not shown in FIG. 7. Alternatively, in another embodiment, the one or more senone scores can be stored elsewhere such as, for example and without limitation, within SSU module 530. Here, SSU module 530 can transfer the one or more senone scores to HMM scoring module 730 via bus 525. SSU module 530 calculates one or more senone scores prior to the calculation of HMM state scores by HMM scoring module 730, according to an embodiment of the present invention.

In an embodiment, HMM scoring module 730 applies the following equation to compute an HMM state score for each of the HMM states above the pruning threshold:

$$\text{Score}_{K,T} = \text{MAX}(\text{Score}_{K,T-1}, \text{Score}_{K-1,T-1}) + \text{Score}_{SENONE,T}(K),$$

where K is an HMM state index of a given ARC and T is a time frame or interval (e.g., time frames or intervals of 10 ms). In an embodiment, the HMM states of a given ARC above the pruning threshold are sequentially received by HMM scoring module 730 (i.e., K−2, K−1, K, K+1, K+2, ...). Further, in an embodiment, the score of the left context HMM state (K−1) is available during the calculation of the current HMM state score (K), where the maximum of the scores between $\text{Score}_{K,T-1}$ and $\text{Score}_{K-1,T-1}$ is added to the senone score corresponding to the state index (K).

Prior to calculating the HMM state score for the current state index (K), the HMM state scores associated with the inactive HMM states (e.g., the HMM states associated with scores below the pruning threshold set by histogram pruning module 720) are set to a minimum probability value such as, for example and without limitation, the lowest value associated with a particular data format, according to an embodiment of the present invention. For example, if the HMM state score is stored in a 16-bit data format, then the lowest value associated with this format is 0. If the HMM state score for the current state index (K) is higher than the minimum probability value (e.g., 0), then the HMM state is flagged as being "active," according to an embodiment of the present invention. Otherwise, the HMM state maintains its "inactive" status.

In reference to FIG. 7, histogram generator 740 is configured to generate a distribution of HMM state scores to be used to calculate the pruning threshold for the next time interval or frame. In an embodiment, histogram generator 740 receives HMM states with the "active" status from HMM scoring module 740, the best HMM state score from the previous frame of data (e.g., maximum HMM state score from the previous frame of data), and bin width information. The bin width information can include the number of bins and the width of each of the bins, in which the active HMM states are distributed into the bins. In an embodiment, the number of bins and the width of each of the bins are pre-defined and provided by the CPU to ACP 500.

Prior to the binning process, the scores of the active HMM states are updated by subtracting the best HMM state score from the previous frame of data from each of the active HMM state scores, according to an embodiment of the present invention. In an embodiment, the HMM states with updated scores less than zero are placed in a first bin and the HMM states with updated scores greater than zero are placed in a second bin. After all of the active HMM states have been binned, the distributions of the active HMM states are sent to the CPU for calculation of the next pruning threshold used in histogram pruning module 720. In another embodiment, histogram generator 740 is used to calculate the next pruning threshold used in histogram pruning module 720. The calculation of the pruning threshold is known to a person of ordinary skill in the art.

In reference to FIG. 7, pre-pruning module 750 is configured to receive HMM states with the "active" status from HMM scoring module 730 and a pre-pruning threshold. In an embodiment, the pre-pruning threshold is calculated by the CPU and transferred to ACP 500 of FIG. 5, where the pre-pruning threshold is a function of the pruning thresholds from one or more previous frames of data. In another embodiment, the pre-pruning threshold can be generated by pre-pruning module 750. If the score associated with an active HMM state is below the pre-pruning threshold, then the status of the HMM state is changed from "active" to "inactive." Further details on the calculation of the pre-pruning threshold are described below in Section 6.

Arc generator 760 is configured to receive HMM states with the "active" status from pre-pruning module 750—i.e., HMM states with scores above the pre-pruning threshold. In an embodiment, arc generator 760 is configured to determine whether the current HMM state is the last state of the HMM, where the HMM has N number of states (e.g., N=3). If the current HMM state is the last state in the HMM and also has an "active" status, then the HMM state is written to buffer 780, according to an embodiment of the present invention. The HMM state information is transferred from buffer 780 to the CPU via interface module 510 of FIG. 5 for further processing. If the current HMM state is not the last state in the HMM and also has an "active" status, then the HMM state information is hashed and inserted into the active list (e.g., data is hashed and stored in memory device 620 of FIG. 6 with status information stored in memory device 770 of FIG. 7). Unlike conventional speech recognition systems 200 and 300 of FIGS. 2 and 3, respectively, a dedicated memory device (e.g., memory device 620 of FIG. 6 and memory device 770 of FIG. 7) is used to store the active list such that a dedicated HMM scoring module (e.g., HMM module 520 of FIG. 5) is used to calculate HMM state scores rather than using system memory (e.g., memory device 230 of FIG. 2) and a CPU (e.g., processing unit 220), thus reducing the load placed on the CPU and the system memory. In turn, the CPU can process digital signals from other applications, where the CPU can operate in a multiuser/multiprogramming environment that concurrently processes data from a plurality of applications.

Figure 8:
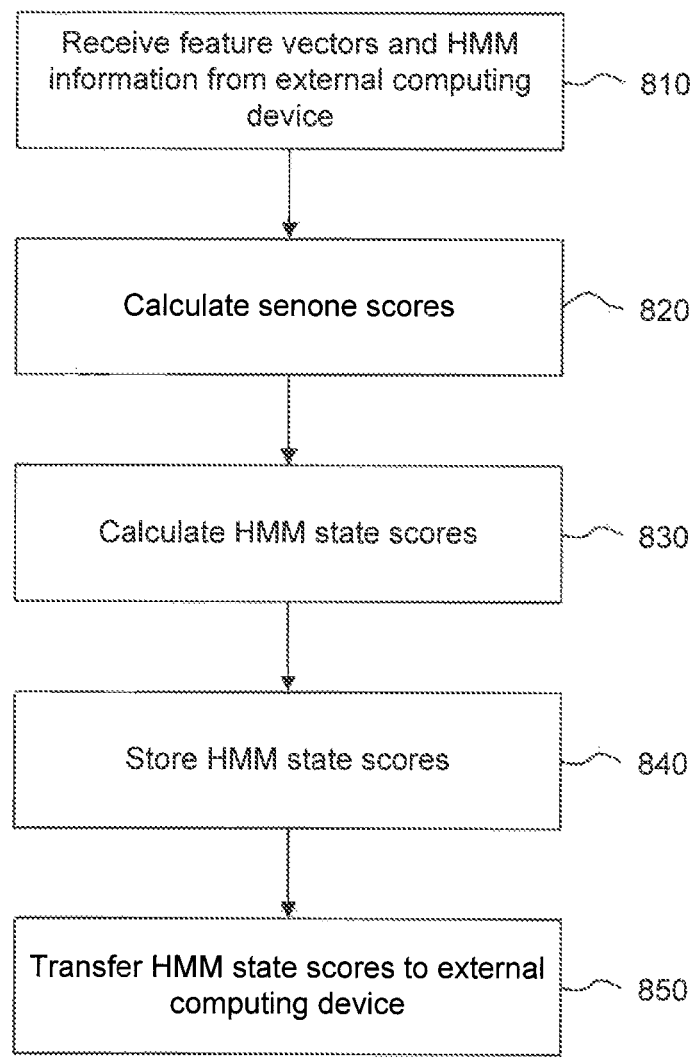
FIG. 8 is an illustration of an embodiment of a method for acoustic signal processing.

FIG. 8 is an illustration of a method 800 for acoustic signal processing. The steps of method 800 can be performed using, for example, ACP 500 of FIG. 5.

In step 810, one or more feature vectors and HMM information are received from an external computing device (e.g., a CPU in communication with ACP 500 via I/O bus 505 of FIG. 5). The HMM information can include, for example, an HMM dictionary, HMM state information, and a priori transition probability information.

In step 820, one or more senone scores are calculated based on the one or more feature vectors. The one or more senone scores can be calculated using a SSU such as, for example, the SSU disclosed in U.S. patent application Ser. No. 13/489,799, filed Jun. 6, 2012 (see, e.g., SSU 1430 of FIG. 14 and associated description). In an embodiment, the one or more senone scores for a frame of data are calculated while the external computing device generates a patch list for the frame of data. The patch list is transferred from the external computing device to the HMM module (see step 830 below). Further, the patch list can include a first plurality of HMM IDs and HMM state scores that are not stored in an active list of a second plurality of HMM IDs and HMM state scores (see, e.g., the active list described above with respect to HMM generator 710 of FIG. 7).

In step 830, one or more HMM state scores are calculated based on the one or more senone scores. The one or more HMM state scores can be calculated using an HMM module such as, for example, HMM module 520 of FIG. 5. In an embodiment, the one or more senone scores (see step 820) are calculated prior to the calculation of the one or more HMM state scores.

In step 840, the one or more HMM state scores are stored in a memory module, where the memory module, SSU, and HMM module are integrated on a first chip and the external computing device is integrated on a second chip—the first chip is separate from the second chip. The memory module can be, for example, memory module 540 of FIG. 5.

In step 850, the one or more HMM state scores are transferred to the external computing device. The one or more HMM state scores can be transferred to the external computing device using an interface module such as, for example, interface module 510 of FIG. 5.

Embodiments of the present invention address and solve the issues discussed above with respect to conventional speech recognition system 200 of FIG. 3. In summary, the phoneme evaluation process is performed by, for example, ACP 500 of FIG. 5. The ACP operates in conjunction with a CPU, in which the ACP can receive one or more feature vectors (e.g., feature vectors 315 of FIG. 3) from the CPU, calculate a senone score (e.g., senone score 325 of FIG. 3) based on one or more Gaussian probability distributions, calculate a phoneme score based on the senone score, and output a phoneme score to the CPU. In an embodiment, the one or more Gaussian probability distributions and one or more HMMs can be stored in a memory device located in the ACP. Alternatively, in another embodiment, the one or more Gaussian probability distributions and HMMs can be stored in a dedicated memory device external to the ACP, in which the ACP receives the one or more Gaussian probability distributions and HMMs from an external memory device. Based on embodiments of the ACP architecture described above, accelerated calculations for the senone and phoneme scores are achieved.

5. HASHING AND INSERTING OF ARC DATA IN ACTIVE LIST

As discussed above in Section 4, HMM generator 710 receives arc data from a patch list stored in buffer 780 of FIG. 7. The following section describes embodiments of hashing and inserting the arc data from the patch list into an active list of a memory device (e.g., memory device 770 of FIG. 7). For explanation purposes, the embodiments below are described in the context of a speech recognition application. However, based on the description herein, a person of ordinary skill in the art will recognize that these embodiments can be applied to other applications such as, for example and without limitation, image processing, audio processing, and handwriting recognition. These other applications are within the spirit and scope of the embodiments disclosed herein.

A. Hash Table Structure

Figure 9:
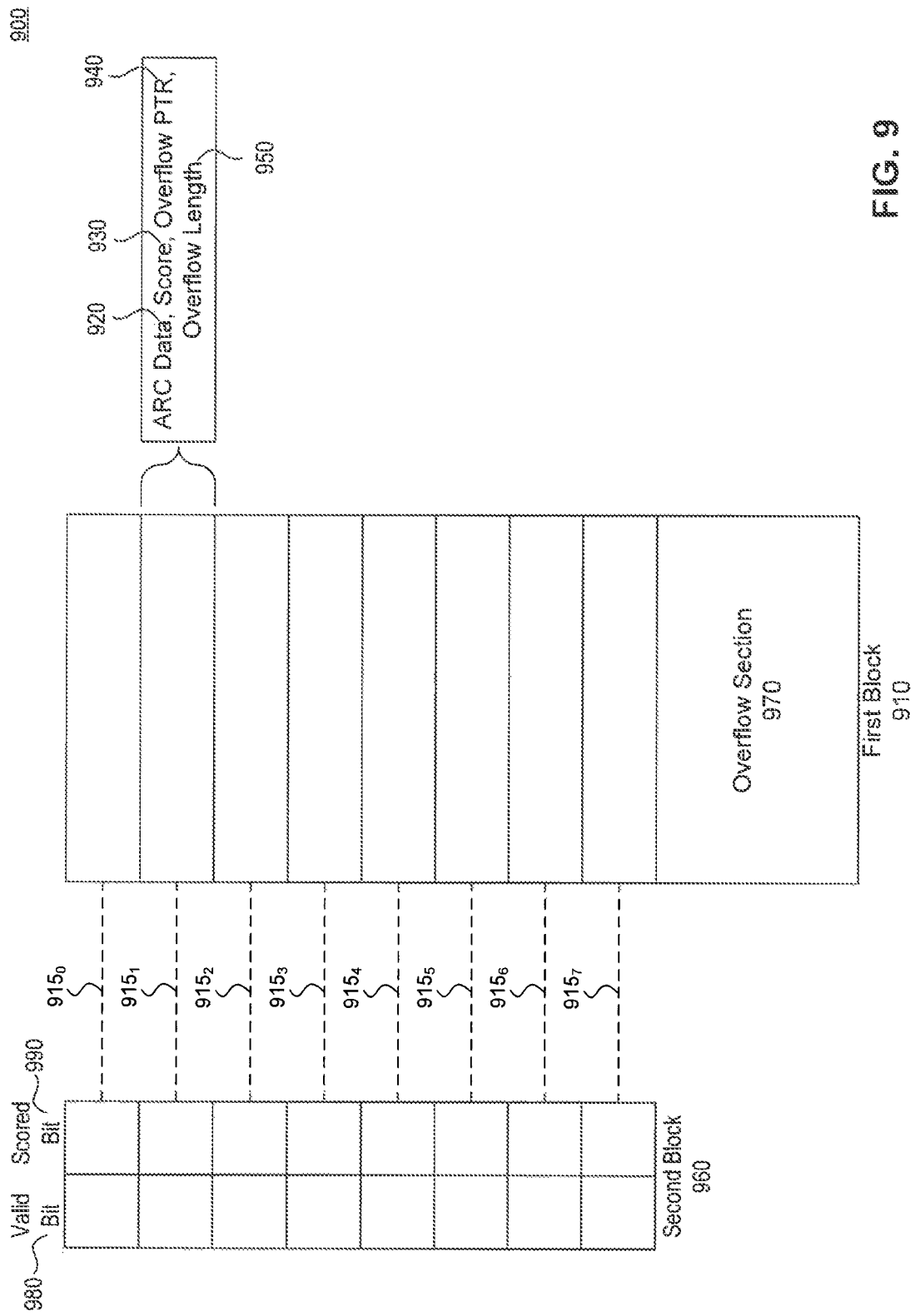
FIG. 9 is an illustration of an embodiment of a hash table.

FIG. 9 is an illustration of a hash table 900 according to an embodiment of the present invention. Hash table 900 can be implemented, for example, in memory device 620 of FIG. 6 and memory device 720 of FIG. 7, as will be described in further detail below. Hash table 900 includes two memory blocks, first block 910 and second block 960. In an embodiment of the present invention, second block 960 can have a smaller memory capacity than first block 910. For example, second bock 960 can contain fewer memory entries than first block 910. Second block 960 can also contain fewer status bits for each entry than first block 910. In contrast, a larger data format (e.g., number of data bits) can be required for each entry in first block 910 as compared to each entry in second block 960. For example, each entry in first block 910 can contain HMM information whereas each entry in second block 960 can contain a status or flag bit information.

In view of the above characteristics of first block 910 and second block 960, these memory blocks can be implemented in a data pattern system to achieve, for example, a faster, cheaper, power efficient implementation. For example, first block 910 and second block 960 can be implemented on separate memory devices (or chips), where second block 960 is implemented on a smaller memory device with a faster access time than the memory device of first block 910. As a result, system performance can be improved by processing the information in second block 960 first to determine if the information in first block 910 is valid and has already been processed before accessing first block 910. A speech recognition system implementing hash table 900 can, thus, limit the number of times it must access first block 910. Based on the description herein, a person of ordinary skill in the art will recognize that hash table 900 can be implemented on other systems. These other systems are within the scope and spirit of the present invention.

In an embodiment of the present invention, first block 910 is implemented in a DRAM device, and second block 960 is implemented in a SRAM device. As would be understood by a person of ordinary skill in the art, SRAM devices have faster access times (e.g., read and write access times) than DRAM devices. However, DRAM devices have a smaller chip footprint, and are cheaper to manufacture at higher memory densities than SRAM devices. Thus, with the tradeoffs between SRAM and DRAM devices, a system implementing hash table 900 gains the advantages of, for example, the speed of the SRAM device to minimize the number of accesses to the slower DRAM device, while also taking advantage of the smaller size and lower cost of the DRAM device to store the majority of the data used by the system.

In reference to FIG. 9, each entry in first block 910 corresponds to an entry in second block 960, as indicated by dotted lines $915_0$-$915_7$, according to an embodiment of the present invention. That is, an index value associated with an entry in second block 960 has the same index value as its corresponding entry in first block 910 such that there is one-to-one mapping between first block 910 and second block 960 with respect to the data stored in first block 910. In an embodiment, each entry in first block 910 includes data and information regarding the memory location of overflow data. In an embodiment, if the data to be stored in first block 910 is too large to fit in a single entry, the extra data is stored in an overflow section 970. This allows hash table 900 to maintain the mapping between entries in second block 960 and first block 910. In another embodiment, overflow section 170 is optional and is not allocated memory space in first block 910.

The entries in first block 910 can be organized in multiple ways. For example, each entry in first block 910 can include arc data 920, score 930, an overflow pointer 940, and an overflow length 950 as shown in FIG. 9. Data 920 can represent HMM information used by speech recognition applications such as, for example, the HMM information used in ACP 500 of FIG. 5, according to an embodiment of the present invention. In an embodiment, the arc data 920 includes HMM IDs. Score 930 includes the current state scores for the HMM, i.e., the HMM state scores for the currently processed states. Overflow pointer 940 can point to a memory location in overflow section 970 of first block 910, which stores any portion of data 930 that could not be stored in an entry of first block 910. Overflow length 950 can be used to identify how much extra data is stored in overflow section 970 for a particular entry in first block 910.

In an embodiment, each hash entry in second block 960 includes multiple status bits that indicate whether the corresponding entry in first block 910 needs to be accessed and whether further processing is required for the information stored in the corresponding entry in first block 910. For example, in the speech recognition context, two bits can be stored for each entry in second block 960 as shown in FIG. 9. In an embodiment, the first bit (also referred to herein as "valid bit 980") can indicate whether the corresponding entry in first block 910 is valid (e.g., data resides in that memory location for a particular frame of data). The second bit (also referred to herein as "scored bit 990") can indicate whether the corresponding entry in first block 910 has already been scored for a particular frame of data (e.g., HMM state score), according to an embodiment of the present invention.

B. Hash Table Procedures

Figure 10:
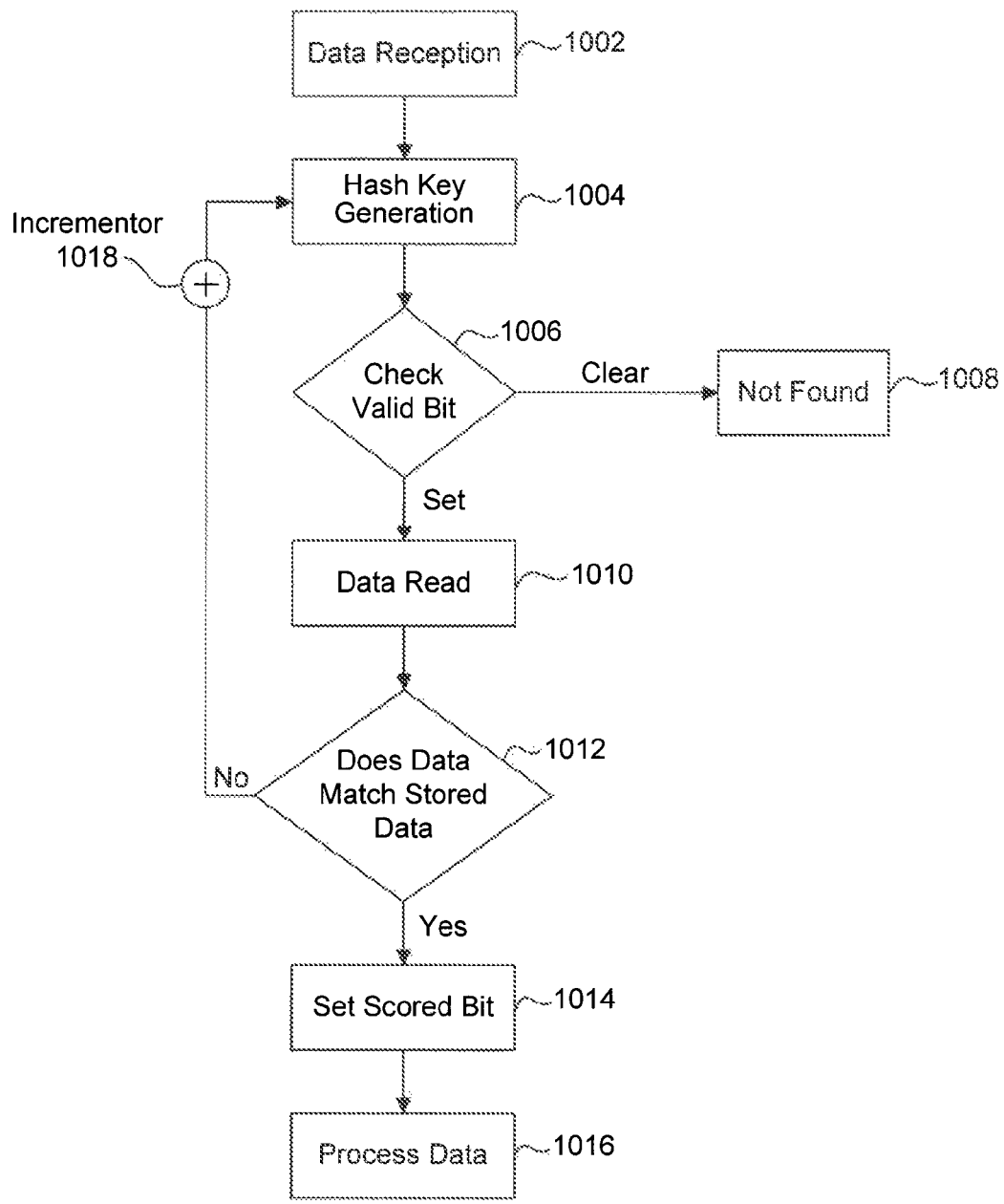
FIG. 10 is an illustration of an embodiment of a hash table search process.
Figure 11:
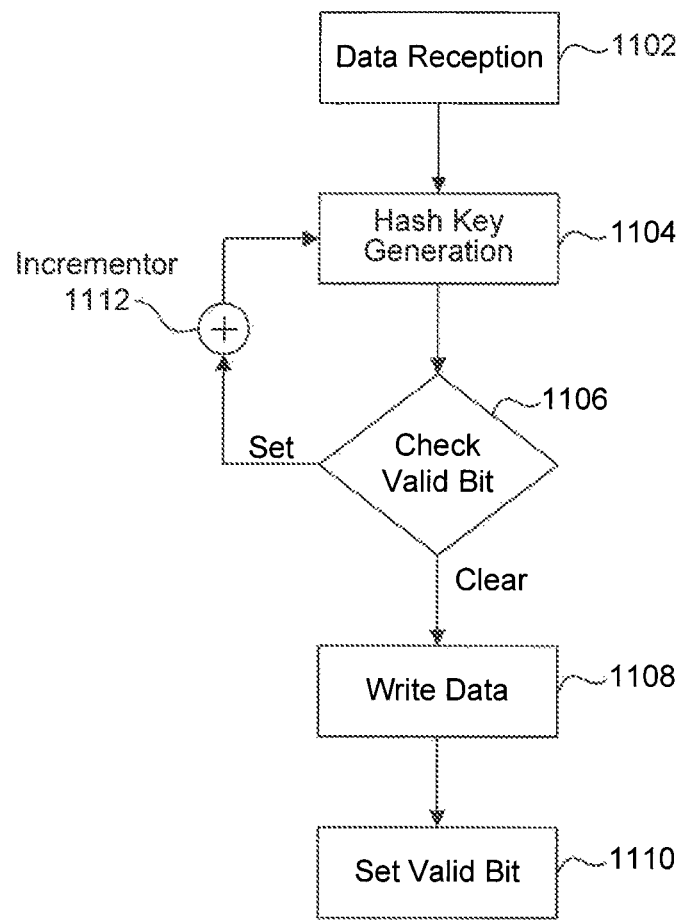
FIG. 11 is an illustration of an embodiment of a hash table insertion process.
Figure 12:
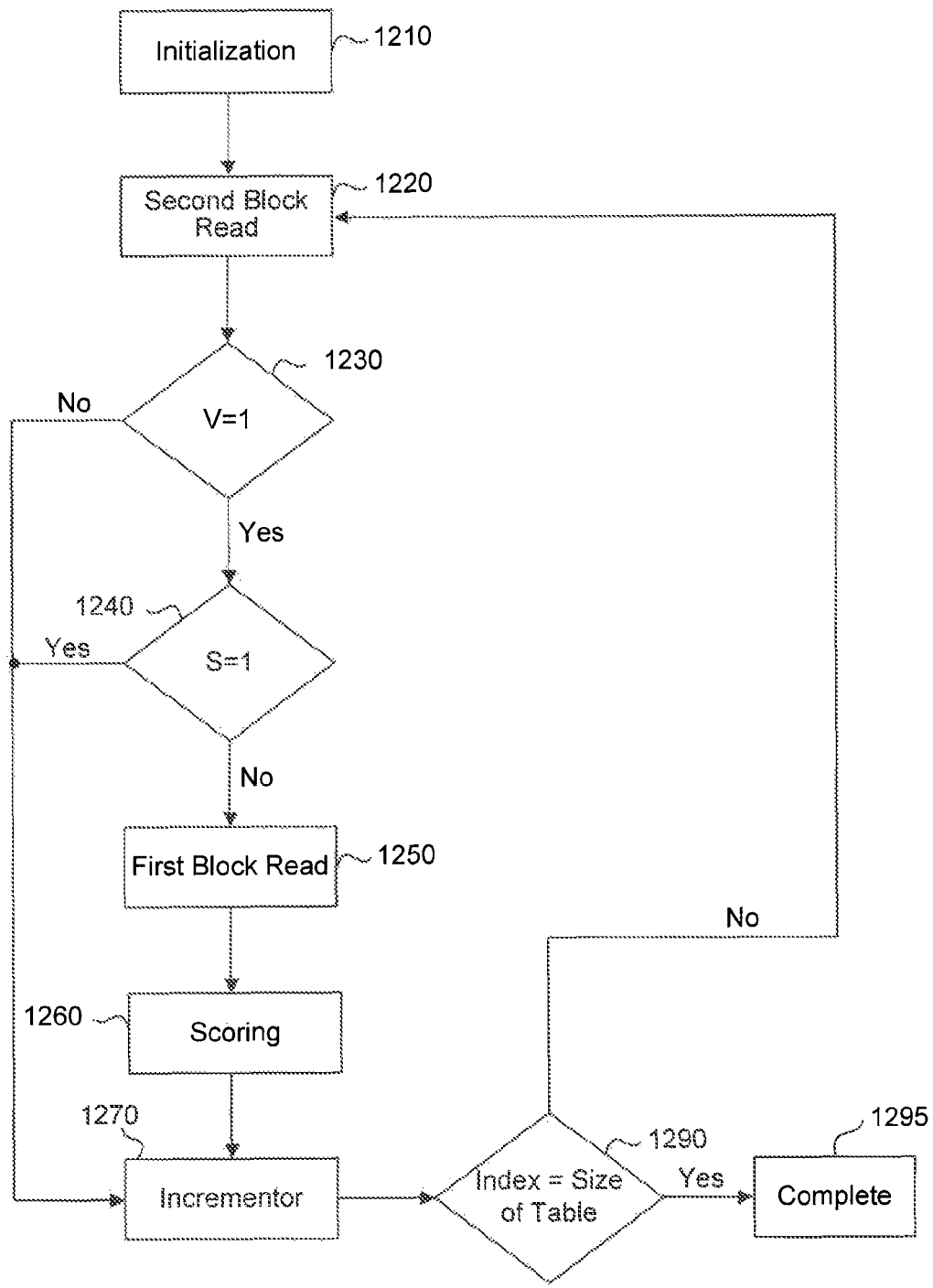
FIG. 12 is an illustration of an embodiment of a hash table residual active process.

FIGS. 10, 11, and 12 are illustrations of hash table processes according to embodiments of the present invention. FIG. 10 is an illustration of a hash table search process 1000. FIG. 11 is an illustration of a hash table insertion process 1100. FIG. 12 is an illustration of a hash table residual active process 1200.

i. Hash Table Search Procedure

Hash table search process 1000 can be performed using, for example, ACP 500 of FIG. 5. Hash table search process 1000 includes data reception step 1002, hash key generation step 1004, check valid bit step 1006, not found step 1008, data read step 1010, comparison step 1012, set scoring bit step 1014, process data step 1016, and incrementor step 1018.

In data reception step 1002, an iteration count is set to '0' and data is received (e.g., by ACP 500 of FIG. 5). In reference to ACP 500 of FIG. 5, this data may be one or more feature vectors representing a sound that is part of a larger frame and arc data in a patch list. In an embodiment, arc data from the patch list includes HMM information, where the patch list is provided to ACP 500 from an external computing device (e.g., a CPU in communication with ACP 500 via I/O bus 505 of FIG. 5).

In hash key generation step 1004, a hash key is generated by executing a hash function on the arc data (from step 1002), in which the hash key provides an index to the hash table. In an embodiment, the hash table refers to the active list described above with respect to HMM generator 710 of FIG. 7. In an embodiment, the hash table (or active list) is stored in memory device 620 of FIG. 6. The hash function is performed on the arc data from the patch list, where the result of the hash function provides an index to the hash table to which the arc data corresponds, according to an embodiment of the present invention.

In an embodiment, the hash function can be a broken down into two separate hash functions. An example of a hash function that is made up of two separate hash functions is shown in the following equation:

$$H(x)=(H1(x)+i*H2(x)) \bmod p$$

The first hash function H1(x) generates a first temporary value based on the arc data from the patch list. The second hash function H2(x) generates a second temporary value based on the arc data, in which the second hash function H2(x) is multiplied by a count i. The count i can represent the number of times the hash function H(x) has been calculated. The results of the two hash functions are combined, as shown in the equation above, to create an index into the hash table, according to an embodiment of the present invention.

In an embodiment, the two hash functions can be designed so that when data is hashed, for example arc data from the patch list, the results are randomly distributed over the entire hash table. One of many benefits of this type of design is a reduction in the number of collisions while storing data to the hash table, thereby increasing the speed and efficiency of hash table search process 1000 and hash table insertion process 1100, discussed below. For example, the first hash function H(x) can randomly distribute the data over the entire hash table, thus mitigating against data being allocated to the same memory index. This decreases the overall time required to store the data being hashed. The second hash function H2(x) can create a random step used to determine the next hash index, in case of a collision, mitigating the effects of sequential collisions. This decreases the time to find an available memory index, in case of a collision.

In check valid bit step 1006, a status bit is read from second block 960 of FIG. 9, such as, for example, valid bit 980. This status bit identifies whether the corresponding entry in first block 910 is valid. In an embodiment, an entry in first block 910 is valid if there is data stored in the entry for the current frame of data; otherwise, if there is no data, then the entry is not valid. Check valid bit step 1006 determines if the valid bit is set (i.e., the corresponding entry in first block 910 contains data for the current frame of data) or clear (i.e., the corresponding entry in first block 910 does not contain data for this frame).

Storing a valid bit in second block 960 (e.g., valid bit 980) indicating whether a corresponding entry in first block 910 is valid provides at least two benefits. First, where first block 910 has a slower access time than second block 960, the valid bit in second block 960 provides a quick way to determine if first block 910 needs to be accessed. Second, by storing valid bits separately in a memory device with a faster access time (e.g., SRAM device), the memory device can quickly invalidate the entries in both memories (e.g., memory device 620 of FIG. 6 and memory device 770 of FIG. 7) by accessing the faster memory device that includes second block 960 and clearing all valid bits in second block 960. This is useful, for example, when the hash table needs to be prepared to accept data for a new frame of data. For example, in reference to ACP 500 of FIG. 5, once HMM state scores for a frame of data are calculated, this allows ACP 500 to quickly invalidate the entire table in preparation for a new frame of data.

If the valid bit in second block 960 for the index of this iteration is clear (e.g., the corresponding entry in first block 910 does not contain data), process 1000 continues to not found step 1008. In not found step 1008, process 1000 indicates that the data was not found in the hash table.

In reference to FIG. 10, in check valid bit step 1006, if the entry in second block 960 for the index for this iteration indicates this entry is valid (e.g., the corresponding entry in first block 910 contains data), process 1000 continues to stored data read step 1010. The stored data is read from the corresponding entry in first block 910 for this index. In an embodiment, due to the nature of creating a hash key from the arc data, there are two scenarios in which the valid bit is set. First, the arc data could have been received for a previous frame by, for example, ACP 500 of FIG. 5. If so, the arc data would have resulted in the same hash key as the previously-received arc data and been stored in the same hash entry. Second, different arc data may have been received that resulted in the same hash key, either in the first hashing iteration or in subsequent iterations. Before proceeding, it must be determined if the current arc data has been stored in the table entry or if different arc data was stored in the table entry. Thus, at comparison step 1012, the stored arc data is compared to the received arc data.

In reference to FIG. 10, if the stored arc data is not the same as the received arc data, process 1000 returns to step 1004 to execute another iteration of the hashing function. In this case, the received arc data is different from the stored arc data; however, the received arc data resulted in the same key as the stored arc data when processed by the hash function. In order to create a different hash key for the received arc data, process 1000 continues to incrementor step 1018, where the iteration count i is incremented.

If the stored arc data is the same as the received arc data, process 1000 continues to set scoring bit step 1014, where scored bit 990 is set for this index in second block 960. Process 1000 then continues to process data step 1016, where the data is processed and scored.

ii. Hash Table Insertion Procedure

Hash table insertion process 1100 can be performed using, for example, ACP 500 of FIG. 5. Hash table insertion process 1100 includes data reception step 1102, hash key generation step 1104, check valid bit step 1106, write data step 1108, set valid bit step 1110, and incrementor step 1112.

Data reception step 1102 and hash generation step 1104 receive data and generate a hash key in the same manner as data reception step 1002 and hash generation step 1004, respectively, as described above.

In check valid bit step 1106, a status bit is read from second block 960 of FIG. 9 such as, for example, valid bit 980. This status bit identifies whether the corresponding entry in first block 910 is valid. In an embodiment, an entry in first block 910 is valid if there is data stored in the entry for the current frame of data; otherwise, if there is no data, then the entry is not valid. Check valid bit step 1106 determines if the valid bit is set (e.g., the corresponding entry in first block 910 contains data for the current frame of data) or clear (e.g., the corresponding entry in first block 910 does not contain data for this frame).

As described above, it is beneficial to store a valid bit in second block 960 (e.g., valid bit 980) indicating whether a corresponding entry in first block 910 is valid. As discussed above, storing the valid bit in second block 960, corresponding to an entry in first block 910, provides at least two benefits. First, if provides a quick way to determine which entry in the first block 910 needs to be accessed, especially when access to second block 960 is faster than access to first block 910. Second, it provides a fast and effective way to invalidate all entries in both first block 910 and second block 960.

If the valid bit in second block 960 for the index of this iteration is set (e.g., the corresponding entry in first block 910 contains data), process 1100 executes another iteration of the hashing function to identify a different location to insert the data. In order to create a different hash key for the received arc data, process 1100 continues to incrementor step 1112, where the iteration count is incremented.

In reference to FIG. 11, in check valid bit step 1106, if the entry in second block 960 for the index for this iteration indicates this entry is invalid (e.g., the corresponding entry in first block 910 does not contain data), process 1100 continues to write data step 1108. The received data is stored in first block 910. Process 1100 continues to set valid bit step 1110, where the valid bit corresponding to this entry is set in second block 960. This indicates, for future searches, that this entry now contains valid data.

iii. Hash Table Residual Active Procedure

FIG. 12 is an illustration of a hash table residual active process 1200 according to an embodiment of the present invention. In the speech recognition context, after the arc data from the patch list has been processed (e.g., by HMM module 520 of FIG. 5), unprocessed arc data in the active list may exist (also referred to herein as "residual data"). Process 1200 scans the active list (e.g., stored in memory device 770 of FIG. 7) to identify HMMs that are valid (e.g., valid bit 980 is set) but have not been scored. The HMM data is then retrieved from memory (e.g., memory device 540 of FIG. 5) and scored. Process 1200 includes an initialization step 1210, a second block read step 1220, a first block read step 1250, a scoring step 1260, an incrementor step 1270, a final step 1295, and three comparison steps 1230, 1240, and 1290.

In initialization step 1210, a table index is set to zero. In second block read step 1220, valid bit 980 and scored bit 990 are read from the table index of second block 960 of FIG. 9. In comparison step 1230, process 1200 determines if valid bit 980 is set or clear.

If valid bit 980 is clear, this is an indication that no data has been stored for the entry in the hash table. Therefore, process 1200 continues to incrementor step 1270, which will be discussed below.

If valid bit 980 is set, indicating that there is arc data in the hash table, process 1200 continues to comparison step 1240. In comparison step 1240, it is determined if scored bit 990 is set or clear.

If scored bit 990 is set, this is an indication that the arc data has already been scored. Therefore, no further processing is required, and process 1200 continues to incrementor step 1270, which will be discussed below.

If scored bit 990 is clear, process 1200 continues to first block read step 1250. In first block read step 1250, process 1200 reads the arc data from the index in first block 910 of FIG. 9. Once the arc data has been read in first block read step 1250, process 1200 continues to scoring step 1260 where the stored arc data is scored. Process 1200 then continues to incrementor step 1270.

In incrementor step 1270, valid bit 980 and scored bit 990 in second block 960 are cleared for the current index, and then the index is incremented. Process 1200 then continues to comparator step 1290.

In comparator step 1290, the new index (e.g., incremented index) is compared to the size of the hash table. If the index is equal to or greater than the size of the hash table, process 1200 is complete. If not, process 1200 returns to second block read step 1220 to analyze information related to the new index.

6. PRE-PRUNING

As discussed above with respect to FIG. 7, pre-pruning module 750 receives active HMM states from HMM scoring module 740 and a pre-pruning threshold. In an embodiment, the pre-pruning threshold is calculated by the CPU and transferred to ACP 500 of FIG. 5, where the pre-pruning threshold is a function of the pruning threshold from one or more previous frames of data. In another embodiment, the pre-pruning threshold can be generated by pre-pruning module 750 of FIG. 7.

Pruning provides a way to reduce the resources required to process speech by early detection of which HMMS are unlikely to represent the speech being analyzed. This is important given the processing resources and memory allocated to the speech recognition process; especially as acoustic models grow to more accurately model language. Pruning thresholds are used to determine which HMMs are retained for further processing in the speech recognition process based on the probability that the HMMs represent the speech being analyzed.

In an embodiment, speech processing systems prune HMM states at two different times. First, systems can prune HMM states after the HMM states have been processed and scored but before the next frame of data is analyzed. This pruning process is also referred to herein as "pre-pruning." Second, systems can prune HMM states prior to the calculation of HMM state scores. Because pruning occurs after the HMM states have been processed and scored from the previous frame, the pruning threshold can be chosen such that only a certain number of HMM states, for example 1000, is analyzed with respect to the current frame of data.

The following discussion focuses on the pre-pruning process of a speech recognition system. The pre-pruning process can be performed by, for example, pre-pruning module 750 of FIG. 7. Pre-pruning allows the system to remove HMM states before they are stored in memory (e.g., memory device 620 of FIG. 6). Typically, a user of the speech recognition system selects a constant value for the pre-pruning threshold to determine which HMM states are stored in memory. Because the pre-pruning threshold is constant and chosen before the HMM processing starts, it must be large enough such that a sufficient number of HMM states are available for fluctuations in sound quality (in this description, lower HMM state scores represent higher probabilities). These fluctuations can be accounted for in the constant value for the pre-pruning threshold. Typically, the value of the pre-pruning threshold is conservatively set to a large number for speech recognition on low-sound quality environments. The constant value for the pre-pruning threshold does not adjust for speech recognition in high-sound quality environments, which typically has lower HMM state scores.

In reference to FIG. 7, pre-pruning module 750 flags an HMM state as "inactive" if the corresponding HMM state score is worse, e.g., less, than a pre-pruning threshold. In an embodiment, the pre-pruning threshold can be adjusted based on the pruning thresholds (e.g., pruning threshold applied by histogram pruning module 720 of FIG. 7) for the previous N frames, where N is a positive integer. By using an adjustable pre-pruning threshold which is based on the pruning threshold of one or more previous frames of data, the adjustable pre-pruning threshold can be calibrated to prune some, but not all, of the HMM states independent of the sound quality (e.g., low-sound quality environment versus high-sound quality environment). The adjustable pre-pruning threshold can either be provided by processing unit 220 of FIG. 2, or can be calculated within pre-pruning module 750 of FIG. 7, after receiving one or more previous pruning thresholds from processing unit 220. Pre-pruning module 750 of FIG. 7, can also receive HMM state scores for one or more previous frames of data from histogram generator 740 (via HMM scoring module 730) and senone scores from SSU 530 of FIG. 5.

In an embodiment, an adjustable pre-pruning threshold is a function of an HMM state score from a previous frame of data and a pruning threshold from the previous frame of data. The adjustable pre-pruning threshold can be defined by the following equation:

$$P_{PRE,T+1} = \text{Score}_{BEST,HMM,T} + \Delta_{T+1}$$

$P_{PRE,\ T+1}$ = Actual pre-pruning threshold for Frame T+1;

$\text{Score}_{BEST,\ HMM,\ T}$ = The best HMM state score from Frame T; and $\Delta_{T+1}$ = A currently calculated pre-pruning threshold based on the pruning threshold of one or more previous frames of data.

In summary, based on the above equation, the adjustable pre-pruning threshold is the sum of a processed HMM state score, for instance the best HMM score, from the previous frame of data and the pruning thresholds from one or more previous frames of data, according to an embodiment of the present invention. The calculated pre-pruning threshold can be backed off based on one or more senone scores of Frame T+1 or by one or more histogram bins.

In another embodiment, the adjustable pre-pruning threshold is a function of one or more senone scores from a previous frame of data, one or more senone scores from a current frame of data, or one or more histogram bins. This can be used in addition to a processed HMM state score from the previous frame of data and the pruning threshold from one or more previous frames of data. The adjustable pre-pruning threshold can be defined by the following equation:

$$P_{PRE,T+1} = \text{Score}_{BEST,HMM,T} + \text{Score}_{BEST,SENONE} + \Delta_{T+1}$$

$P_{PRE, T+1}$=Actual pre-pruning threshold for Frame T+1;

$\text{Score}_{BEST, HMM, T}$=The best HMM state score from Frame T;

$\text{Score}_{BEST, SENONE}$=A possible back-off value based on one or more senone scores of Frame T+1, one or more senone scores of Frame T, or one or more histogram bins; and, $\Delta_{T+1}$=A currently calculated pre-pruning threshold based on the pruning threshold of one or more previous frames of data.

In an embodiment, the processed HMM state score can be the score for the best HMM. The senone scores can be a senone from a current frame of data or from a previous frame of data, according to an embodiment of the present invention. In an embodiment, the senone score can be the best senone score from a previous frame or the best senone score from the current frame. In an embodiment, the senone score can also be modified by the width of one or more bins of the histogram. For example, if pruning in the previous frame passed K bins, the back-off value could be used to pass K+1 or K+2 bins in the pre-pruning phase of the current frame.

7. EXEMPLARY COMPUTER SYSTEM

Figure 13:
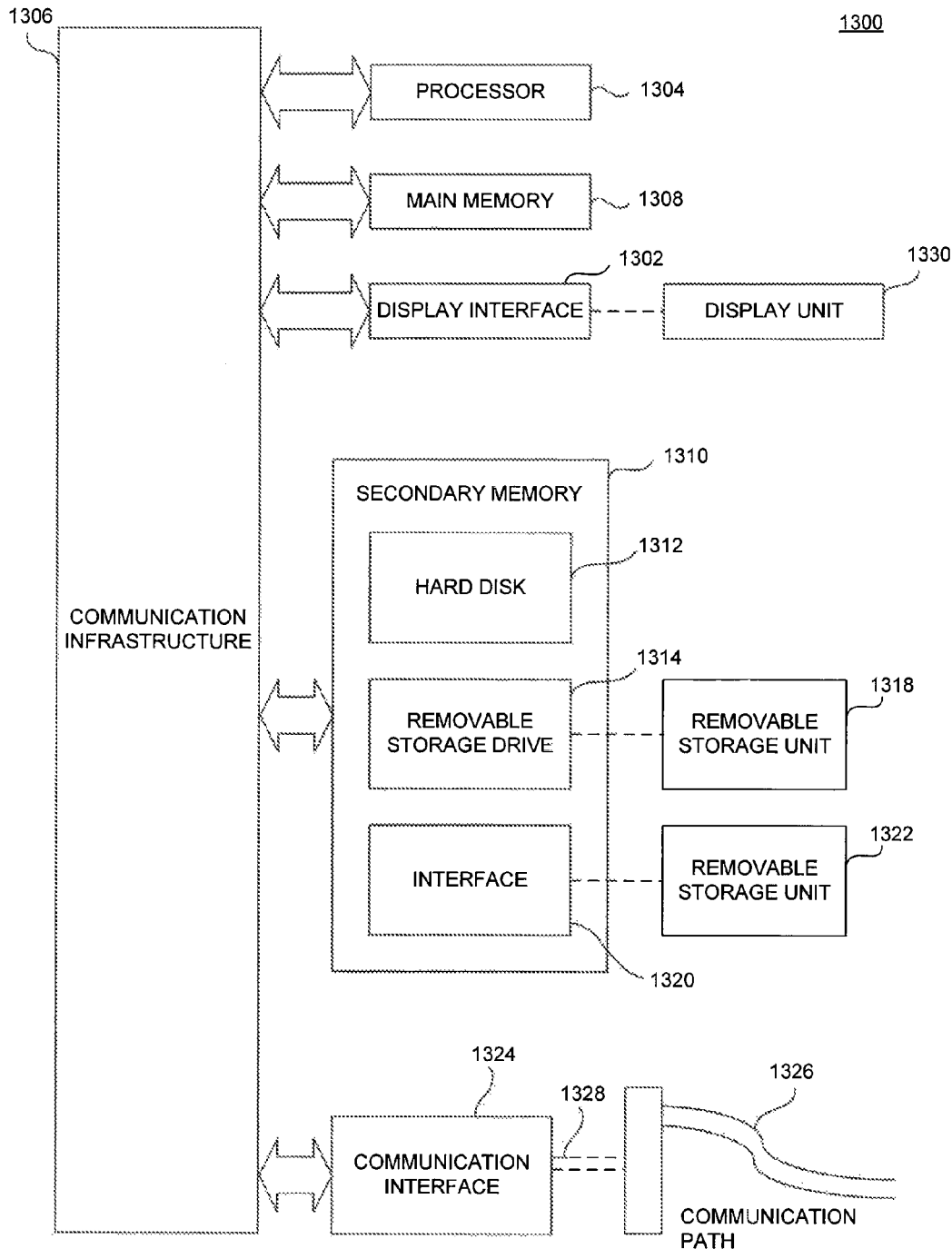
FIG. 13 is an illustration of an example computer system in which embodiments of the present invention, or portions thereof, can be implemented as computer readable code.

Various aspects of the present invention may be implemented in software, firmware, hardware, or a combination thereof. FIG. 13 is an illustration of an example computer system 1300 in which embodiments of the present invention, or portions thereof, can be implemented as computer-readable code. For example, the method illustrated by flowchart 800 of FIG. 8, the method illustrated by flowchart 1000 of FIG. 10, the method illustrated by flowchart 1100 of FIG. 11, and/or the method illustrated by flowchart 1200 of FIG. 12 can be implemented in system 1300. Various embodiments of the present invention are described in terms of this example computer system 1300. After reading this description, it will become apparent to a person skilled in the relevant art how to implement embodiments of the present invention using other computer systems and/or computer architectures.

It should be noted that the simulation, synthesis and/or manufacture of various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet.

It is understood that the functions accomplished and/or structure provided by the systems and techniques described above can be represented in a core (e.g., a ACP core) that is embodied in program code and can be transformed to hardware as part of the production of integrated circuits.

Computer system 1300 includes one or more processors, such as processor 1304. Processor 1304 may be a special purpose or a general-purpose processor such as, for example, the ACP and CPU of FIG. 4, respectively. Processor 1304 is connected to a communication infrastructure 1306 (e.g., a bus or network).

Computer system 1300 also includes a main memory 1308, preferably random access memory (RAM), and may also include a secondary memory 1310. Secondary memory 1310 can include, for example, a hard disk drive 1312, a removable storage drive 1314, and/or a memory stick. Removable storage drive 1314 can include a floppy disk drive, a magnetic tape drive, an optical disk drive, a flash memory, or the like. The removable storage drive 1314 reads from and/or writes to a removable storage unit 1318 in a well-known manner. Removable storage unit 1318 can comprise a floppy disk, magnetic tape, optical disk, etc. which is read by and written to by removable storage drive 1314. As will be appreciated by persons skilled in the relevant art, removable storage unit 1318 includes a computer-usable storage medium having stored therein computer software and/or data.

Computer system 1300 (optionally) includes a display interface 1302 (which can include input and output devices such as keyboards, mice, etc.) that forwards graphics, text, and other data from communication infrastructure 1306 (or from a frame buffer not shown) for display on display unit 1330.

In alternative implementations, secondary memory 1310 can include other similar devices for allowing computer programs or other instructions to be loaded into computer system 1300. Such devices can include, for example, a removable storage unit 1322 and an interface 1320. Examples of such devices can include a program cartridge and cartridge interface (such as those found in video game devices), a removable memory chip (e.g., EPROM or PROM) and associated socket, and other removable storage units 1322 and interfaces 1320 which allow software and data to be transferred from the removable storage unit 1322 to computer system 1300.

Computer system 1300 can also include a communications interface 1324. Communications interface 1324 allows software and data to be transferred between computer system 1300 and external devices. Communications interface 1324 can include a modem, a network interface (such as an Ethernet card), a communications port, a PCMCIA slot and card, or the like. Software and data transferred via communications interface 1324 are in the form of signals which may be electronic, electromagnetic, optical, or other signals capable of being received by communications interface 1324. These signals are provided to communications interface 1324 via a communications path 1326. Communications path 1326 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 1318, removable storage unit 1322, and a hard disk installed in hard disk drive 1312. Computer program medium and computer-usable medium can also refer to memories, such as main memory 1308 and secondary memory 1310, which can be memory semiconductors (e.g., DRAMs, etc.). These computer program products provide software to computer system 1300.

Computer programs (also called computer control logic) are stored in main memory 1308 and/or secondary memory 1310. Computer programs may also be received via communications interface 1324. Such computer programs, when executed, enable computer system 1300 to implement embodiments of the present invention as discussed herein. In particular, the computer programs, when executed, enable processor 1304 to implement processes of embodiments of the present invention, such as the steps in the method illustrated by flowchart 800 of FIG. 8, the method illustrated by flowchart 1000 of FIG. 10, the method illustrated by flowchart 1100 of FIG. 11, and/or the method illustrated by flowchart 1200 of FIG. 12 can be implemented in system 1300, discussed above. Accordingly, such computer programs represent controllers of the computer system 1300. Where embodiments of the present invention are implemented using software, the software can be stored in a computer program product and loaded into computer system 1300 using removable storage drive 1314, interface 1320, hard drive 1312, or communications interface 1324.

Embodiments of the present invention are also directed to computer program products including software stored on any computer-usable medium. Such software, when executed in one or more data processing device, causes a data processing device(s) to operate as described herein. Embodiments of the present invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

8. CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the relevant art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for speech recognition, the method comprising:
   hashing, at an acoustic processor, a data to generate a table index; and
   reading, at the acoustic processor, a valid bit at the table index of a first memory device, wherein the valid bit indicates whether a table entry at a corresponding table index of a second memory device is valid.

2. The method according to claim 1, further comprising:
   storing the data at the corresponding table index of the second memory device when the valid bit indicates that the table entry is invalid; and
   setting the valid bit at the table index of the first memory device to indicate that the data stored in the second memory device is valid.

3. The method according to claim 1, further comprising:
   incrementing an iteration count associated with a hashing function when the valid bit indicates that the table entry is valid;
   hashing the data with the hashing function to generate another table index; and
   storing the data at the another table index of the second memory device.

4. The method according to claim 1, further comprising:
   comparing the data to the table entry; and
   setting a scored bit at the table index of the first memory device to indicate that the table entry has been processed when the data matches the table entry.

5. The method according to claim 1, further comprising:
   indicating that the data is not associated with the current frame of data when the valid bit indicates that the table entry is invalid.

6. The method according to claim 4, further comprising:
   comparing the data to the table entry;
   incrementing an increment count associated with a hashing function when the data does not match the table entry; and
   hashing the data with the hashing function to generate another table index.

7. The method according to claim 1, further comprising:
   initializing the table index;
   reading the valid bit at the table index of the first memory device, wherein the table index is incremented to create a second table index for the first memory device when the valid bit indicates that the table entry is invalid; and
   reading a second valid bit at the incremented table index of the first memory device when the incremented table index is less than the size of a table associated with the table index.

8. The method according to claim 7, further comprising:
   reading a scored bit at the table index of the first memory device when the valid bit indicates that the table entry is valid, wherein the scored bit indicates whether the table entry at the corresponding table index has been processed; and
   incrementing the table index to create a third table index when the scored bit indicates that the table entry has been processed, wherein the second memory device comprises a corresponding third table index.

9. The method according to claim 7, further comprising:
   reading a scored bit at the table index of the first memory device when the valid bit indicates that the table entry is valid, wherein the scored bit indicates whether the table entry at the corresponding table index has been processed;

processing the table entry when the scored bit indicates that the table entry has not been processed; and incrementing the table index to create a third table index, wherein the second memory device comprises a corresponding third table index.

10. The method according to claim 1, wherein the hashing comprises applying a first hashing algorithm and a second hashing algorithm, wherein the first hashing algorithm is applied to the data and the second hashing algorithm is applied to the data and includes an iteration multiplication factor.

11. An acoustic processing apparatus, the apparatus comprising:

a first memory device configured to store one or more data elements;

a second memory device configured to store one or more status bits at one or more respective table indices, wherein each of the table indices is mapped to a corresponding table index in the first memory device, one of the one or more status bits is a valid bit, and the valid bit indicates whether a table entry at a corresponding table index of the first memory device contains valid data; and an acoustic processing device configured to calculate one or more hash values based on the one or more data elements.

12. The apparatus of claim 11, wherein the first memory device is slower, has a smaller footprint, or is cheaper to manufacture than the second memory device.

13. The apparatus of claim 11, wherein the first memory device comprises a Dynamic Random Access Memory (DRAM) device and the second memory device comprises a Static Random Access Memory (SRAM) device.

14. The apparatus of claim 11, wherein the hash value is used as an index to a first table and a second table in the first memory device and the second memory device, respectively.

15. The apparatus of claim 11, the one or more data elements comprise arc data, a score, an overflow pointer, an overflow length, or a combination thereof.

16. The apparatus of claim 11, the first memory device further comprises one or more table indices that do not have a corresponding table index in the second memory device.

17. The apparatus of claim 11, wherein the one or more status bits comprise a score bit, wherein the score bit indicates that the one or more data elements at the one or more corresponding table indices in the first memory device has been processed.

18. The apparatus of claim 11, wherein the processing device is configured to apply a first hashing algorithm and a second hashing algorithm to calculate each of the one or more hash values, wherein the first hashing algorithm is applied to each of the one or more data elements and the second hashing algorithm is applied to each of the one or more data elements and includes an iteration multiplication factor.

19. The apparatus of claim 11, wherein the processing device is configured to apply a first hashing algorithm that determines a random sized step, based on the one or more data elements.

* * * * *